United States Patent
Liu et al.

(10) Patent No.: US 12,062,985 B1
(45) Date of Patent: Aug. 13, 2024

(54) CONTROL METHOD FOR FOUR-SWITCH BUCK-BOOST CONVERTER

(71) Applicant: SOUTHEAST UNIVERSITY, Nanjing (CN)

(72) Inventors: Qi Liu, Nanjing (CN); Weiwei Zhai, Nanjing (CN); Leilei Shi, Nanjing (CN); Qinsong Qian, Nanjing (CN); Weifeng Sun, Nanjing (CN); Longxing Shi, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/566,102

(22) PCT Filed: Sep. 26, 2022

(86) PCT No.: PCT/CN2022/121429
§ 371 (c)(1),
(2) Date: Dec. 1, 2023

(87) PCT Pub. No.: WO2024/016473
PCT Pub. Date: Jan. 25, 2024

(30) Foreign Application Priority Data

Jul. 21, 2022 (CN) .......................... 202210863341.6

(51) Int. Cl.
*H02M 3/158* (2006.01)
*H02M 1/00* (2006.01)
*H02M 1/088* (2006.01)

(52) U.S. Cl.
CPC ....... *H02M 3/1582* (2013.01); *H02M 1/0058* (2021.05); *H02M 1/088* (2013.01)

(58) Field of Classification Search
CPC ... H02M 3/1582; H02M 1/0058; H02M 1/088
See application file for complete search history.

(56) References Cited

U.S. PATENT DOCUMENTS

| 4,876,635 A | * | 10/1989 | Park | H02M 3/33573 363/56.05 |
|---|---|---|---|---|
| 5,594,635 A | | 1/1997 | Gegner | |

(Continued)

FOREIGN PATENT DOCUMENTS

| CN | 108667303 A | 10/2018 |
|---|---|---|
| CN | 109004827 A | 12/2018 |

(Continued)

*Primary Examiner* — Rafael O De Leon Domenech
(74) *Attorney, Agent, or Firm* — Bayramoglu Law Offices LLC

(57) ABSTRACT

A control method for a four-switch buck-boost converter is provided. The control method adopts four-stage control, and divides the load range into two sections and adopts different control strategies according to a critical load value corresponding to optimal control. In Boost mode, before the critical load, $T_1$ and $T_2$ are kept constant, $T_3$ is a minimum value for realizing soft-switching, and $T_4$ decreases with the increase of the load; when the critical load is reached, $T_4$ drops to 0; and after the critical load, $T_1$, $T_2$, $T_3$ and T increase with the load. In Buck mode, before the critical load, $T_2$ and $T_3$ are kept constant, $T_1$ is a minimum value for realizing soft-switching, and $T_4$ decreases with the increase of the load; when the critical load is reached, $T_4$ drops to 0; and after the critical load, $T_1$, $T_2$, $T_3$ and T increase with the load.

18 Claims, 8 Drawing Sheets

(56) References Cited

U.S. PATENT DOCUMENTS

| | | | | |
|---|---|---|---|---|
| 6,108,225 | A * | 8/2000 | Iwahori | H02M 7/217 |
| | | | | 363/37 |
| 6,458,164 | B1 * | 10/2002 | Weiss | A61M 60/196 |
| | | | | 623/3.27 |
| 7,327,589 | B2 * | 2/2008 | Chiu | H02M 7/53871 |
| | | | | 363/132 |
| 7,397,196 | B2 * | 7/2008 | Leyten | H05B 41/2926 |
| | | | | 315/225 |
| 9,325,247 | B1 * | 4/2016 | Vinciarelli | H02M 3/33507 |
| 9,502,987 | B1 * | 11/2016 | Feno | H02M 3/33546 |
| 9,571,005 | B2 * | 2/2017 | Pahlevaninezhad | ......... |
| | | | | H02M 7/5387 |
| 9,608,517 | B2 * | 3/2017 | LoCascio | H02M 3/158 |
| 11,784,600 | B2 * | 10/2023 | Xu | H02M 3/1582 |
| | | | | 318/400.3 |
| 11,811,322 | B2 * | 11/2023 | Peron | H02M 3/1582 |

FOREIGN PATENT DOCUMENTS

| | | |
|---|---|---|
| CN | 111092549 A | 5/2020 |
| CN | 114448249 A | 5/2022 |
| CN | 114679056 A | 6/2022 |
| CN | 114726214 A | 7/2022 |

\* cited by examiner

CONTROL METHOD FOR FOUR-SWITCH BUCK-BOOST CONVERTER

CROSS REFERENCE TO THE RELATED APPLICATIONS

This application is the national phase entry of International Application No. PCT/CN/2022/121429, filed on Sep. 26, 2022, which is based upon and claims priority to Chinese Patent Application No. 202210863341.6, filed on Jul. 21, 2022, the entire contents of which are incorporated herein by reference.

TECHNICAL FIELD

The invention discloses a control method for a four-switch buck-boost converter, relates to the DC-DC converter technology of an electric energy conversion device, and belongs to the technical field of power generation, transformation or distribution.

BACKGROUND

With the upgrading of various electronic products, DC power supplies are developing towards higher efficiency, higher integration, and wide input range. Currently, a dual-mode modulation scheme widely applied to buck-boost DC-DC converters enables efficient voltage conversion under different operating conditions. However, when an input voltage approaches an output voltage, the presence of dead zones leads to an increase in voltage ripple and a significant inductor current ripple, causing instability. Furthermore, during the dual-mode modulation process, there will always be a switch that cannot achieve soft-start, thereby limiting the efficiency improvement of the converter.

A four-switch buck-boost converter, as an in-stage buck-boost converter, is widely employed in various applications due to its advantages such as wide input range and bidirectional power flow capability. A quadrangle inductor current control method is a control strategy implemented in four-switch buck-boost converters to achieve zero-voltage switching (ZVS) for power transistors within the full load range. The principle of the quadrangle inductor current control method is to allow the existence of both positive and negative inductor currents in one cycle, thereby achieving ZVS for all power switches. However, due to the simultaneous presence of the positive and negative inductor currents in one cycle, the root-mean-square (rms) value of the inductor currents increases, leading to an increase of the conduction loss. In order to reduce the rms value of the inductor currents, in some control methods, the four-switch converter keeps operating in a critical conduction mode, and the freewheeling mode in the quadrangle control method is eliminated, which increases the energy transfer ratio within one cycle, thus reducing the root-mean-square value of the inductor currents. However, this efficiency optimization method has limited effectiveness in optimizing the converter efficiency at lower loads. There are also some optimized quadrangle inductor currents control methods that focus on minimizing the conduction loss. A fixed-frequency control method capable of adjusting the duration of four stages of a converter was proposed. However, this fixed-frequency control method requires the calculation of the effective value of the inductor currents, which can be a complex task. Additionally, this fixed-frequency control method neglects the impact of the turn-off loss and the drive loss on the converter efficiency. As a result, the effectiveness of this fixed-frequency control method in improving the converter efficiency is limited.

In summary, the control methods for buck-boost converters proposed in the prior art do not optimize efficiency across the full load range, and the issue of low converter efficiency in specific operating conditions still persists. In the usage of converters, the conduction loss, turn-off loss, and drive loss of transistor switches constitute the major portion of the circuit loss. Reducing the mentioned loss is of significant importance in improving the stable operation capability of switching elements, efficiency of circuit topology conversion, and safety of the working environment. The invention aims to propose an improved quadrangle inductor current control method for a four-switch buck-boost converter.

SUMMARY

The invention aims to overcome the deficiencies mentioned in the background art above by providing a control method for a four-switch buck-boost converter. Taking into account the conduction loss, turn-off loss, and drive loss, and using the duration of the first three stages of a quadrangle current control method and the operating frequency of a converter as control variables, a loss analysis is established, the relationship between the loss and the control variables is determined, and a control method capable of reducing the loss is obtained. The ultimate goal is to reduce the loss of the four-switch buck-boost converter and achieve efficient voltage conversion throughout the full load range to solve the technical problem of existing quadrangle inductor current control techniques that efficient voltage conversion throughout the full load range cannot be achieved in a four-switch buck-boost converter.

In order to achieve the above purpose, the invention adopts the following technical scheme.

For a four-switch buck-boost converter consisting of a first transistor switch, a second transistor switch, a third transistor switch, a fourth transistor switch and an inductor, the invention realizes full-load efficient control of the four-switch buck-boost converter through a control signal generator. In the four-switch buck-boost converter, the first transistor switch and the second transistor switch are connected in series to form a first bridge arm, the third transistor switch and the fourth transistor switch are connected in series to form a second bridge arm, the inductor is connected between a midpoint of the first bridge arm and a midpoint of the second bridge arm, an input voltage source is connected between a drain of the first transistor switch and a primary ground, a port between the third transistor switch and a secondary ground forms an output terminal of the converter, and a voltage of the output terminal of the converter is equivalent to an output voltage source. A primary side inductance node, that is, the midpoint of the first bridge arm, is marked as point a, and a secondary side inductance node, that is, the midpoint of the second bridge arm, is marked as point b. The positive direction of an inductor current is defined as from a to b.

By controlling the four transistor switches, the converter is made to operate in four stages within a working cycle.

Powering mode: when the fourth transistor switch is turned on and the second transistor switch is turned off, the powering mode starts, and a reverse inductor current charges a junction capacitor between the first transistor switch and the second transistor switch, so that a voltage of the primary side inductor node increases and finally reaches the input voltage, which allows the first transistor switch to achieve zero-voltage conduction, transferring energy from the input voltage source to the inductor; the magnitude of the inductor current is directly proportional to the duration of this stage, which is Tr; and this stage ends when the fourth transistor switch is turned off.

Direct power path mode: the fourth transistor switch is turned off, and the inductor current starts to charge a junction capacitor between the third transistor switch and the fourth transistor switch, so that when a voltage of the secondary side inductor node increases to the output voltage, the third transistor switch realizes zero-voltage conduction, and energy is directly transferred from the input voltage source to the output terminal of the converter; the slope of the inductor current in this stage is determined by a difference between the input voltage and the output voltage; when the first transistor switch is turned off, this stage ends; and the duration of the direct power path mode is $T_2$.

Reset mode: when the first transistor switch is turned off, the junction capacitor between the first transistor switch and the second transistor switch discharges into the inductor, so that the voltage of the primary side inductor node is reduced to zero, and the second transistor switch realizes zero-voltage conduction, transferring energy stored in the inductor to the output terminal of the converter; when the third transistor switch is turned off, this stage ends; and the duration of the reset mode is $T_3$.

Freewheeling mode: when the third transistor switch is turned off, the junction capacitor between the third transistor switch and the fourth transistor switch discharges into the inductor, so that the voltage of the secondary side inductor node is reduced to zero, the fourth transistor switch realizes zero-voltage conduction, and both ends of the inductor L are connected to the ground, so the inductor current is kept constant at this stage; when the second transistor switch is turned off, this stage ends; and the duration of the freewheeling mode is $T_4$.

For the above circuit and operating mode, to reduce loss and improve efficiency, the mean square value of the inductor current should not be too high, which requires the reduction of the difference between the maximum and minimum values of the inductor current in the same period. In addition, to realize soft-switching of all transistor switches, the inductor current in the powering mode and the inductor discharging stage should be kept at the minimum value for soft-switching. Therefore, when the load is small and the circuit has not entered the continuous conduction mode, there are minimum working time limits for the powering mode ($T_{1\_min}$) and the reset mode ($T_{3\_min}$). When $V_{in} < V_{out}$, that is, in a Boost mode, $T_3$ should be maintained at its minimum value for soft-switching. When $V_{in} > V_{out}$, that is, in a Buck mode, $T_1$ should be maintained at its minimum value for soft-switching.

To achieve a smaller loss throughout the full load range on the premise of realizing soft-switching of all power switches, this invention establishes a loss model to find a control method corresponding to the minimum loss, that is, to find the values of $T_1$, $T_2$, $T_3$ and the period T when the loss is minimized. Firstly, the operating frequency f is set as a variable, and under the same input voltage, the loss corresponding to different load currents is calculated for each period; a loss curve is drawn, and the frequency value of best corresponding to the minimum loss at different load currents under the same input voltage is determined; then, the relationship between the optimal frequency value and the load current is explored, and it is found that under the same input voltage, the optimal frequency $f_{\_best}$ increases and then decreases as the load increases; and a load current corresponding to the maximum value of the optimal frequency $f_{\_best}$ is taken as a critical load at the given input voltage.

The invention adopts a current mode control circuit, including an outer voltage loop and an inner current loop. A sampling circuit acquires the information of the input voltage, the output voltage and the load, and obtains a critical load value under the given working condition according to the sampled input voltage. Then, according to different loads, the control signal generator generates corresponding $T_1$, $T_2$, $T_3$ and period T related to the input voltage, the output voltage and the load current value. The specific control mode is as follows.

At the critical load, circuit efficiency is the highest, and the four-switch buck-boost converter operates in the continuous conduction mode. In the Boost mode, $T_3$ is kept at its minimum value for achieving ZVS, $T_2$ is calculated based on an energy formula, $T_1$ takes a value corresponding to $i_L$ reaching 0, and $T_4$ is 0. In the Buck mode, $T_1$ is kept at its minimum value for achieving ZVS, $T_2$ is calculated based on an energy formula, $T_3$ takes a value corresponding to $i_L$ reaching 0, and $T_4$ is 0.

Under other load conditions, the control over $T_1$, $T_2$, $T_3$, $T_4$ and period Tis as follows.

In the Boost mode, when the load current is less than the critical load, the operating frequency f increases linearly with the load current, and $T_1$, $T_2$ and $T_3$ are maintained at values corresponding to the critical load, that is, $T_3$ is kept at its minimum value for achieving ZVS, $T_2$ is calculated based on an energy formula, $T_1$ takes a value corresponding to $i_L$ reaching 0, and only $T_4$ is reduced; and when the load current is greater than the critical load, the operating frequency f decreases quadratically with the load current, linear coefficients of $T_1$, $T_2$ and $T_3$ increasing with the load current in each working period are determined according to different input conditions, and $T_1$, $T_2$ and $T_3$ linearly increase with the load current by different coefficients under the same input condition, so as to meet the output conditions.

In the Buck mode, when the load current is less than the critical load, the operating frequency f increases linearly with the load current, and $T_1$, $T_2$ and $T_3$ are maintained at values corresponding to the critical load, that is, $T_1$ is kept at its minimum value for achieving ZVS, $T_2$ is calculated based on an energy formula, $T_3$ takes a value corresponding to $i_L$ reaching 0, and only $T_4$ is reduced; and when the load current is greater than the critical load, the operating frequency f decreases quadratically with the load current, linear coefficients of $T_1$, $T_2$ and $T_3$ increasing with the load current in each working period are determined according to different input conditions, and $T_1$, $T_2$ and $T_3$ linearly increase with the load current by different coefficients under the same input condition, so as to meet the output conditions.

By adopting the above technical scheme, the invention has the following beneficial effects.

(1) The control method for a four-switch buck-boost converter provided by the invention uses the duration of four stages and operating frequency of the converter as control variables. The duration of the powering mode and the duration of the reset mode are adjusted at the critical load. Under the condition of being below the critical load, the operating frequency is increased and the duration of the freewheeling mode is reduced based on the real-time load. Under the condition of being above the critical load, the frequency is reduced and the duration of the powering mode, the duration of the direct power path mode, and the duration of the reset mode are increased based on the real-time load. The objective is to minimize the total loss including the conduction loss, turn-off loss and drive loss, ultimately optimizing the operation of the four-switch buck-boost converter. As a result, soft-switching of all power transistors of the four-switch buck-boost converter within the full load range is realized, and the overall loss of the four-switch buck-boost converter within the full load range is reduced, achieving the goal of efficient voltage conversion.

(2) In this invention, the control variables chosen are the duration of the four stages and the operating frequency of the converter that reflect the conduction loss, turn-off loss and drive loss. The converter is controlled to operate at a fixed frequency with ZVS when the real-time load reaches the critical level. The converter is controlled to operate at variable frequencies with ZVS when the real-time load is below or beyond the critical level. Compared to a traditional fixed frequency control method, this method has the advantage of improving efficiency and power density of the converter within the full load range.

Figure 1:
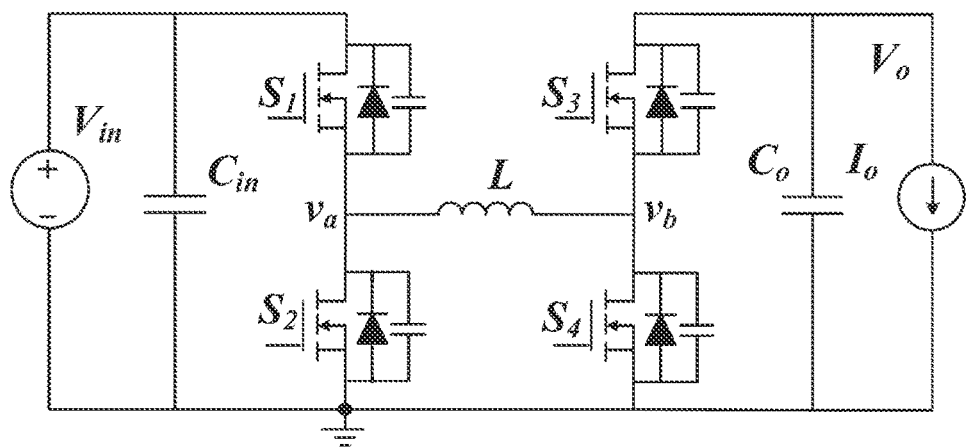
FIG. 1 is a circuit diagram of a four-switch buck-boost converter.

Description of reference numerals in the figures: $S_1$-$S_4$: first to fourth transistor switches; L, inductor; Cin, input capacitor; Co, output capacitor.

DETAILED DESCRIPTION OF THE EMBODIMENTS

The technical scheme of the invention will be described in detail with the attached drawings.

Figure 2A:
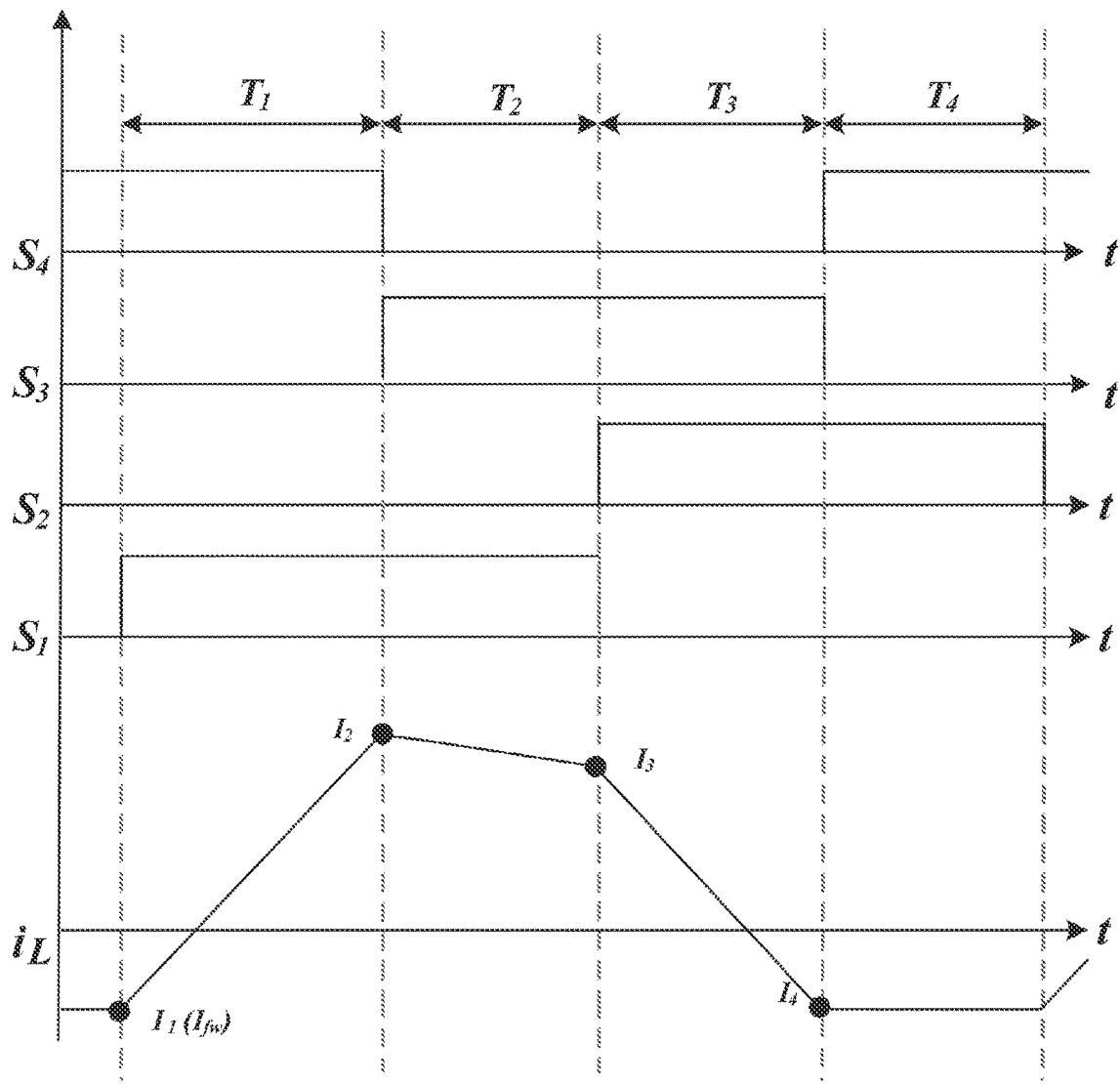
FIGS. 2A and 2B are operating waveforms of a four-switch buck-boost converter in a Boost mode and a Buck mode according to a four-stage current control method.
Figure 2B:
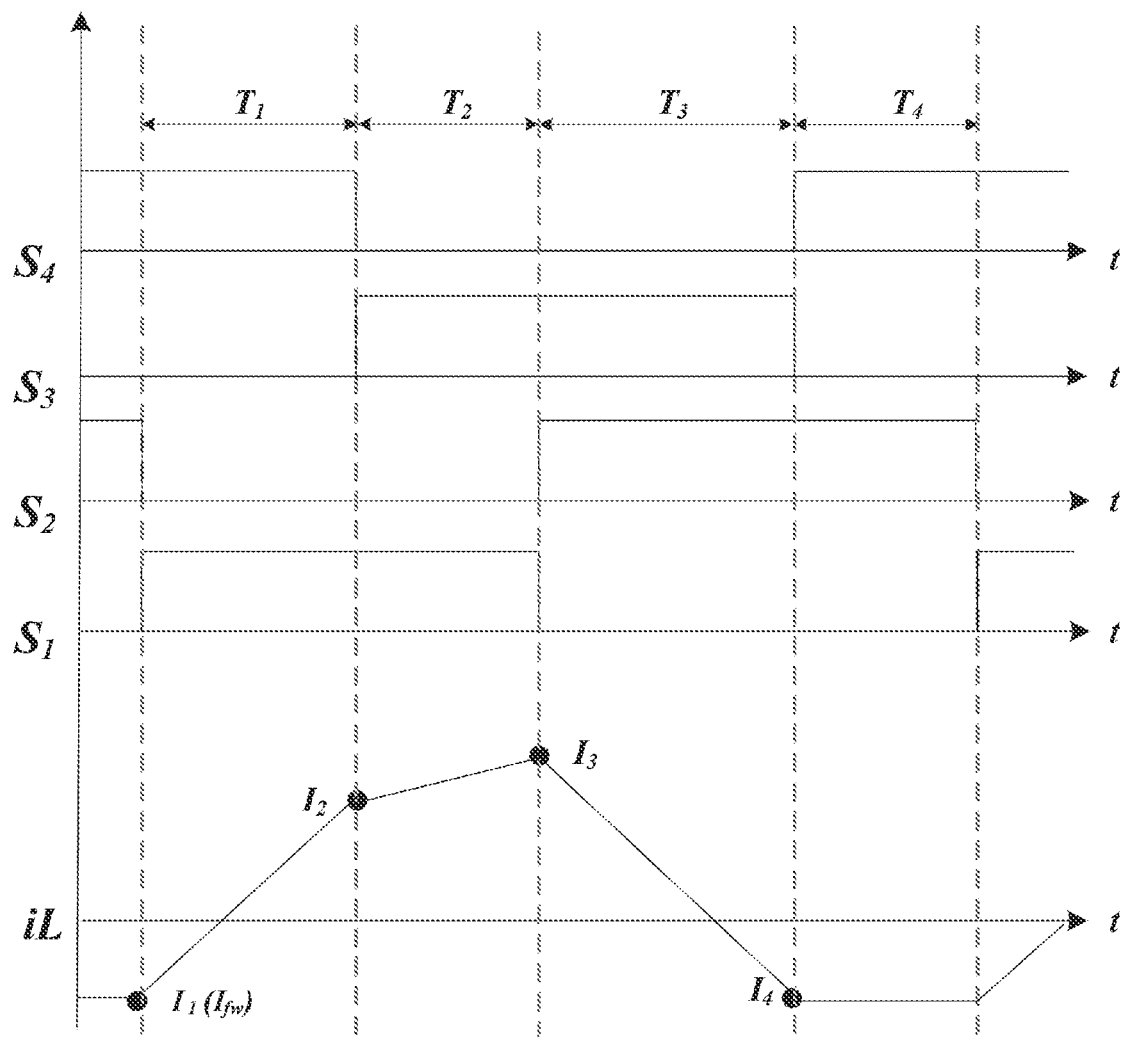

As shown in FIG. 1, a four-switch buck-boost converter is composed of a first transistor switch $S_1$, a second transistor switch $S_2$, a third transistor switch $S_3$, a fourth transistor switch $S_4$ and an inductor L. A transistor switch driving signal is generated by a control signal generator for a control method for a four-switch buck-boost converter. The first transistor switch $S_1$ and the second transistor switch $S_2$ are connected in series to form a first bridge arm, an input capacitor Cin is connected between two terminals of the first bridge arm, the third transistor switch S; and the fourth transistor switch $S_4$ are connected in series to form a second bridge arm, an output capacitor Co is connected between two terminals of the second bridge arm, the inductor L is connected between a midpoint a of the first bridge arm and a midpoint b of the second bridge arm, and an input voltage source Vin is connected between a drain of the first transistor switch $S_1$ and a primary ground. The third transistor switch $S_3$ and a secondary ground form an output terminal of the converter, and an output voltage Vo of the output terminal of the converter is equivalent to a current source Io connected to the output terminal. An inductor current is defined as $i_L$, and the positive direction of the inductor current is from a to b. The control method proposed by the invention enables the four-switch buck-boost converter to operate in four stages as shown in FIGS. 2A and 2B.

Powering mode: when the fourth transistor switch $S_4$ is turned on and the second transistor switch $S_2$ is turned off, the powering mode starts, and a reverse inductor current charges a junction capacitor between the first transistor switch $S_1$ and the second transistor switch $S_2$, so that $V_a$ increases and finally reaches $V_{in}$, which allows the first transistor switch $S_1$ to achieve zero-voltage switching conduction, transferring energy from the input voltage source $V_{in}$ to the inductor L; the magnitude of the inductor current $i_L$ is directly proportional to the duration of this stage, which is $T_1$; and this stage ends when the fourth switch $S_4$ is turned off.

Energy transmission stage: the fourth transistor switch $S_4$ is turned off, and the inductor current $i_L$ starts to charge a junction capacitor between the third transistor switch $S_3$ and the fourth transistor switch $S_4$, so that when $V_b$ increases to $V_o$, the third transistor switch $S_3$ realizes zero-voltage switching conduction, and energy is directly transferred from the input voltage source $V_{in}$ to $V_o$; the slope of the inductor current in this stage is determined by a difference between the input voltage and the output voltage; when the first transistor switch $S_1$ is turned off, this stage ends; and the duration of the direct power path mode is $T_2$.

Reset mode: when the first transistor switch $S_1$ is turned off, the junction capacitor between the first transistor switch $S_1$ and the second transistor switch $S_2$ discharges into the inductor L, so that $V_a$ is reduced to zero, and the second transistor switch $S_2$ realizes zero-voltage conduction, transferring energy stored in the inductor to the output terminal of the converter; when the third transistor switch $S_3$ is turned off, this stage ends; and the duration of the reset mode is $T_3$.

Freewheeling mode: when the third transistor switch $S_3$ is turned off, the junction capacitor between the third transistor switch S; and the fourth transistor switch $S_4$ discharges into the inductor L, so that $V_b$ is reduced to zero, the fourth transistor switch $S_4$ realizes zero-voltage conduction, and both ends of the inductor L are connected to the ground, so the inductor current is kept constant at this stage; when the second transistor switch $S_2$ is turned off, this stage ends; and the duration of the freewheeling mode is $T_4$.

Figure 3:
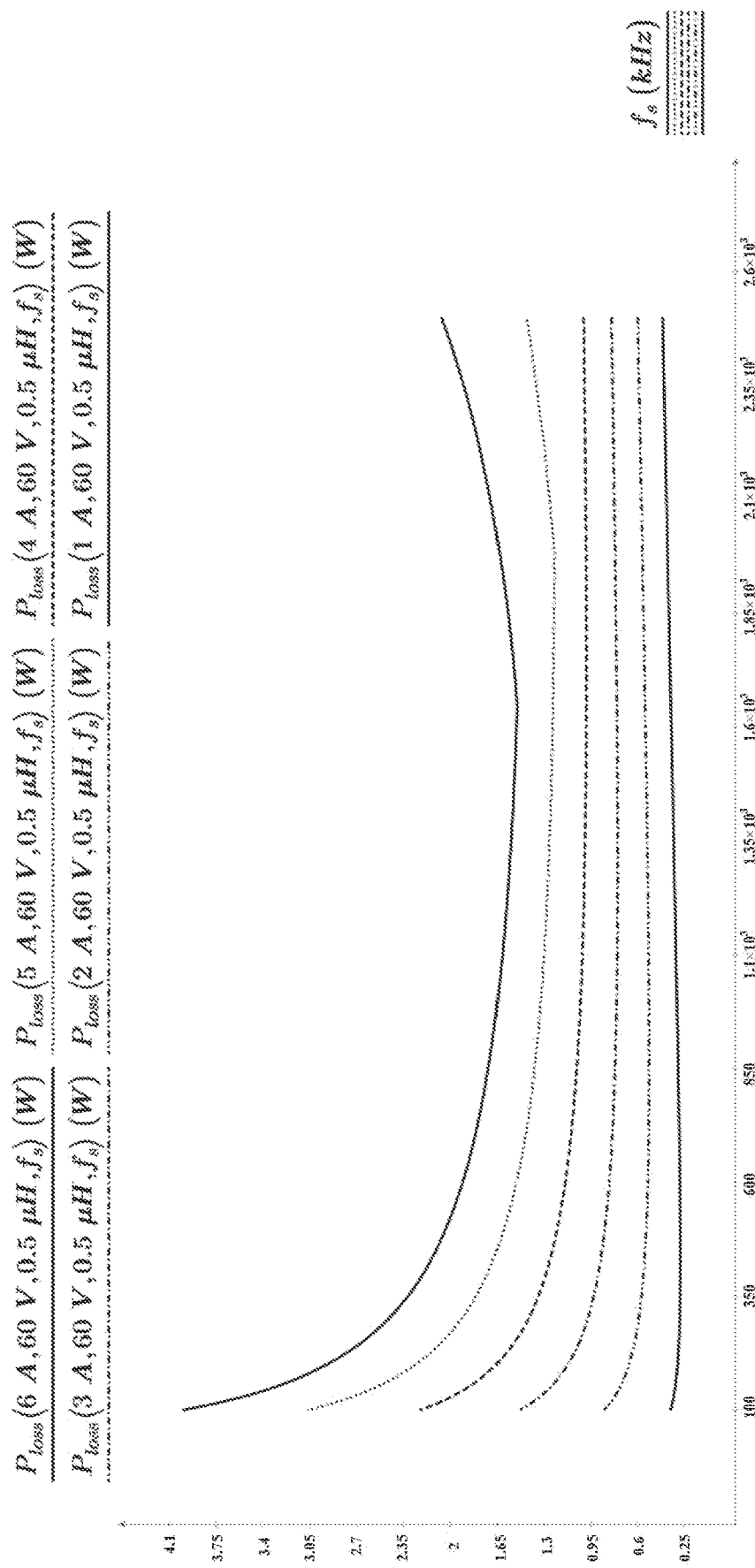
FIG. 3 is a graph of the variation of loss with frequency under different input conditions.
Figure 4:
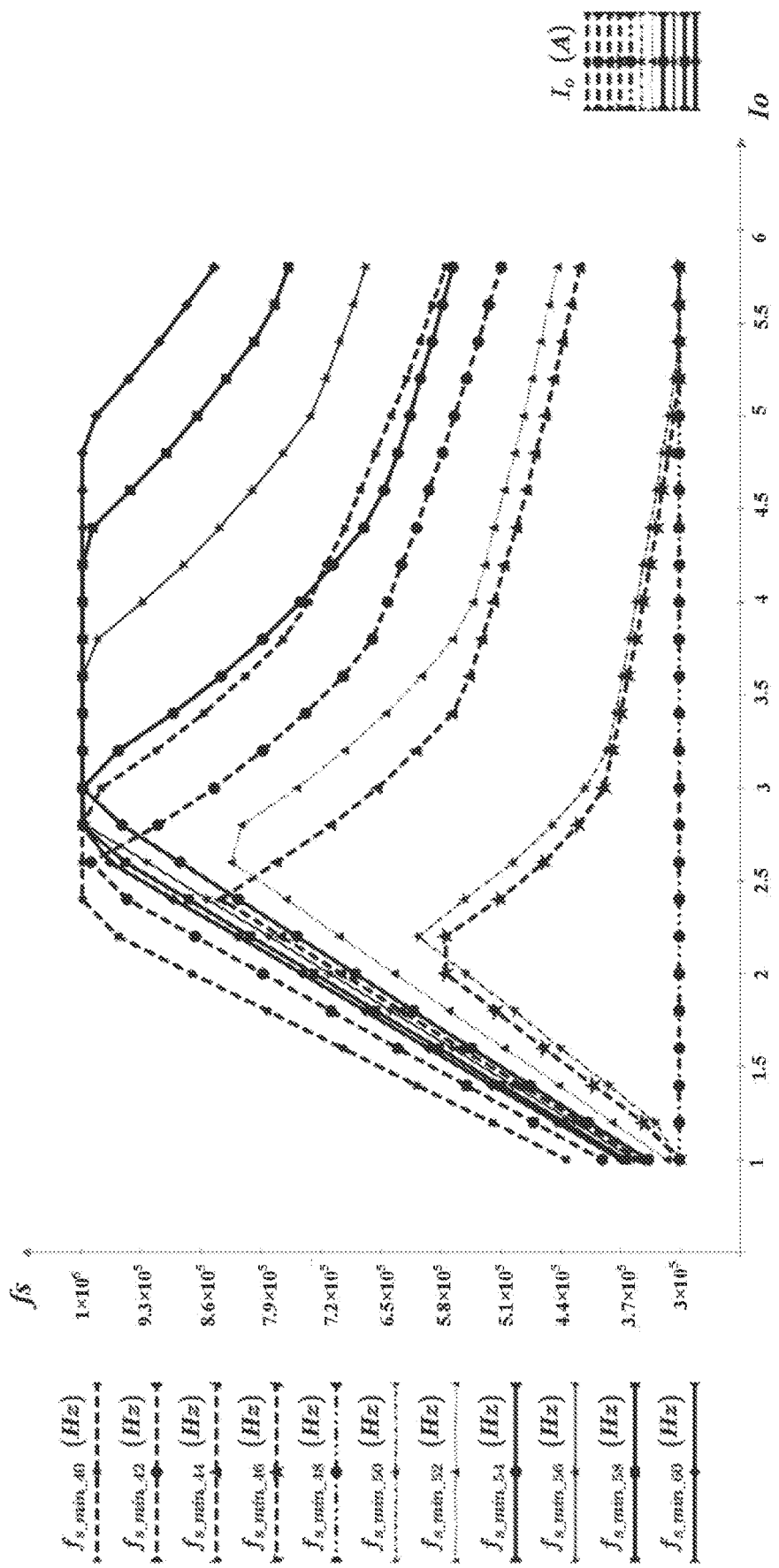
FIG. 4 is a waveform diagram of the variation of frequency with load corresponding to minimum loss under various input conditions.

The full-load range high-efficiency control method of the invention establishes a loss model of the four-switch buck-boost converter, the operating frequency f is set as a variable, the loss corresponding to different load currents under the same input voltage is calculated for each period, and a loss curve is drawn, as shown in FIG. 3. With the variation of the load current, there is a frequency value corresponding to the minimum loss. Then the frequency value corresponding to the minimum loss under the given input voltage is extracted, and the relationship between frequency and load current is drawn, as shown in FIG. 4. As can be seen from FIG. 4, under the same input voltage, with the increase of the load current, the optimal frequency value first increases and then decreases, there is a maximum frequency value, and a load corresponding to the maximum frequency is taken as a critical load at the given input voltage.

Figure 5A:
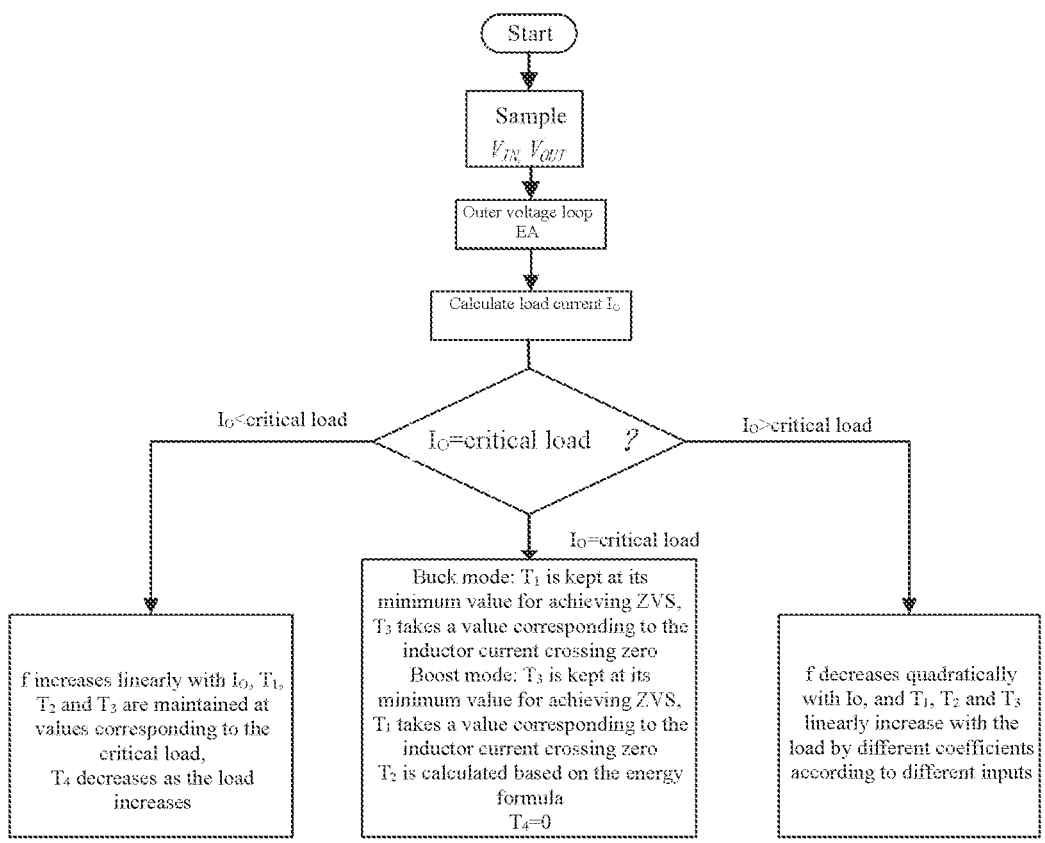
FIG. 5A is a flowchart of control over a four-switch buck-boost converter in the invention.
Figure 5B:
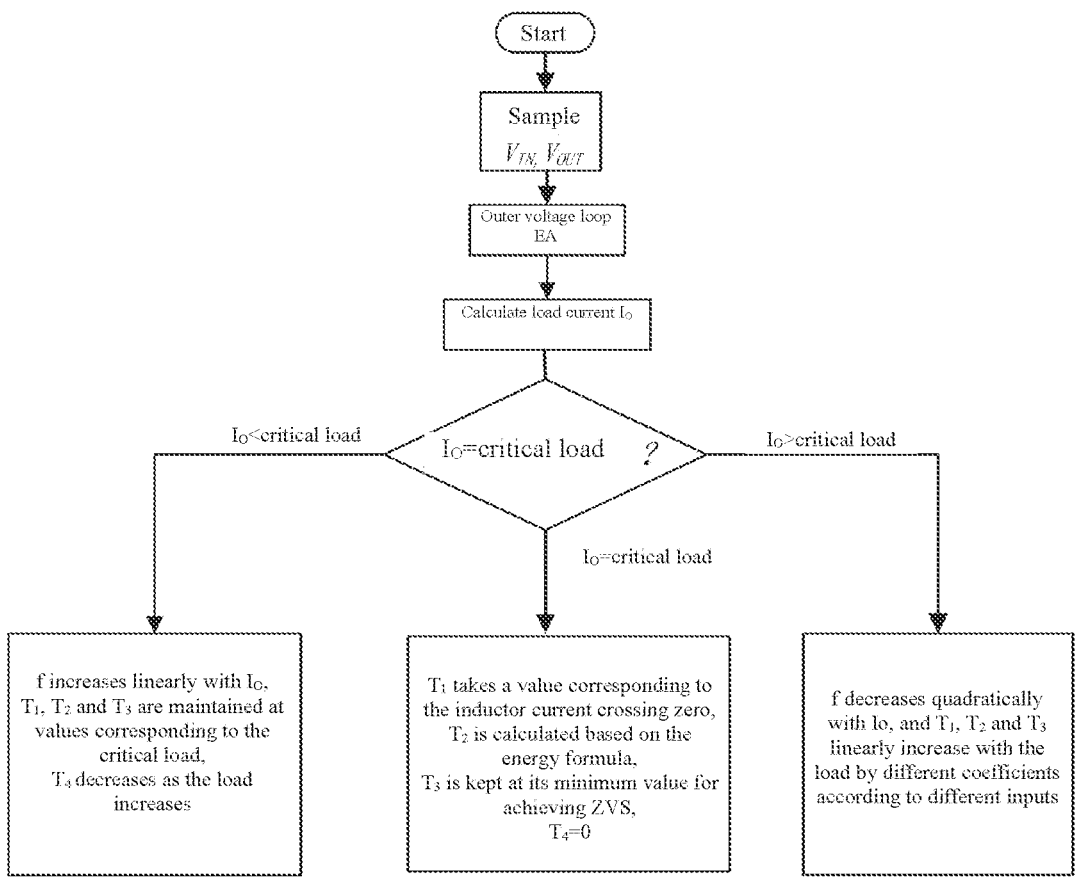
FIGS. 5B and 5C are flowcharts of algorithms for generating control signals in a Boost mode and a Buck mode.
Figure 5C:
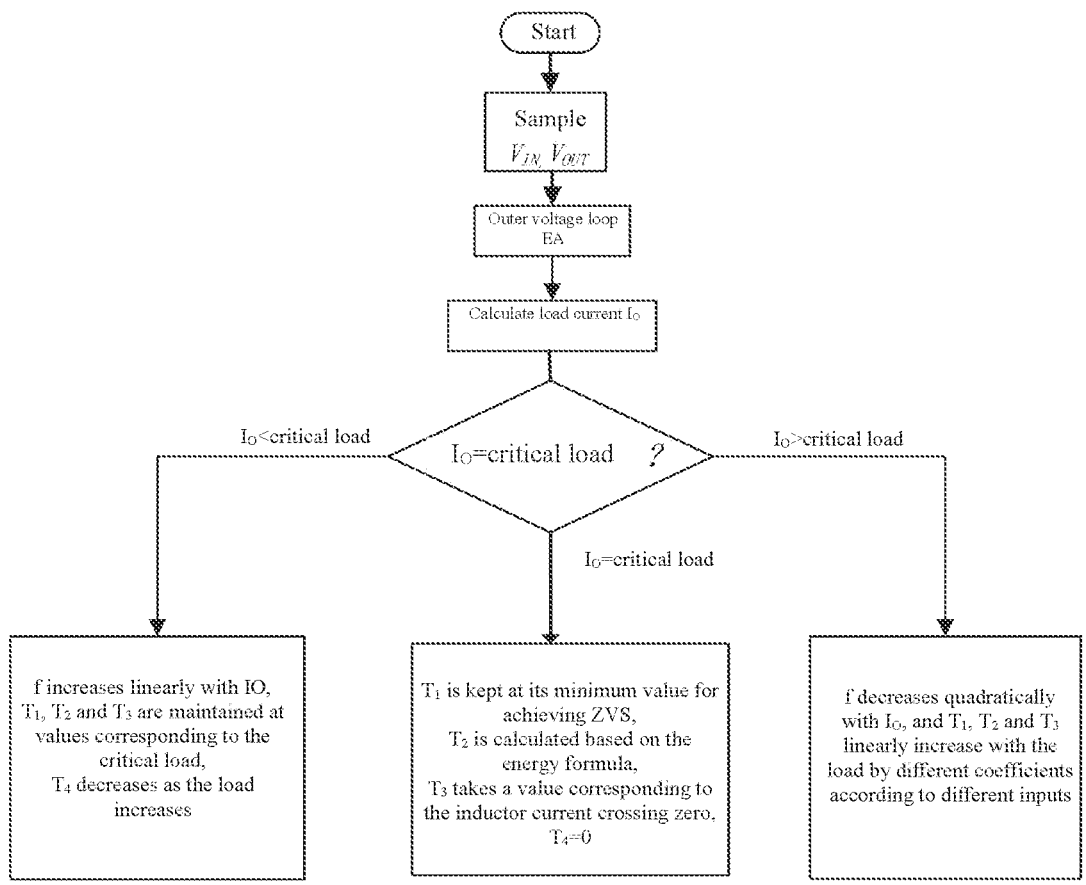

According to the invention, the duration $T_1$, $T_2$, $T_3$ and $T_4$ of the four stages of the four-switch buck-boost converter and period T are taken as variables, the loss model is established by taking into account the conduction loss, turn-off loss and drive loss, a loss curve is obtained under each input voltage and load condition, a frequency value corresponding to the lowest point of each loss curve is taken, and for the optimal frequency under each input condition, a load corresponding to the maximum optimal frequency is taken as a critical load under the given working condition. The value of the load current is detected by an outer voltage loop, and the load range of the four-switch converter is divided into two stages according to the critical load value, which are subjected to different control strategies, so as to realize the control method featuring high-efficiency voltage conversion in the full load range as shown in FIGS. 5A, 5B and 5C.

Stage 1: when the load current reaches the critical load value, circuit efficiency is the highest, and under such load condition, the four-switch buck-boost converter operates in the continuous conduction mode. In a Boost mode, $T_3$ is kept at its minimum value for achieving ZVS, $T_2$ is calculated based on an energy formula, $T_1$ takes a value corresponding to $i_L$ reaching 0, and $T_4$ is 0. In a Buck mode, $T_1$ is kept at its minimum value for achieving ZVS, $T_2$ is calculated based on an energy formula, $T_3$ takes a value corresponding to $i_L$ reaching 0, and $T_4$ is 0.

Stage 2: under other load conditions, the variation of the duration of each stage and the period is as follows.

Figure 6:
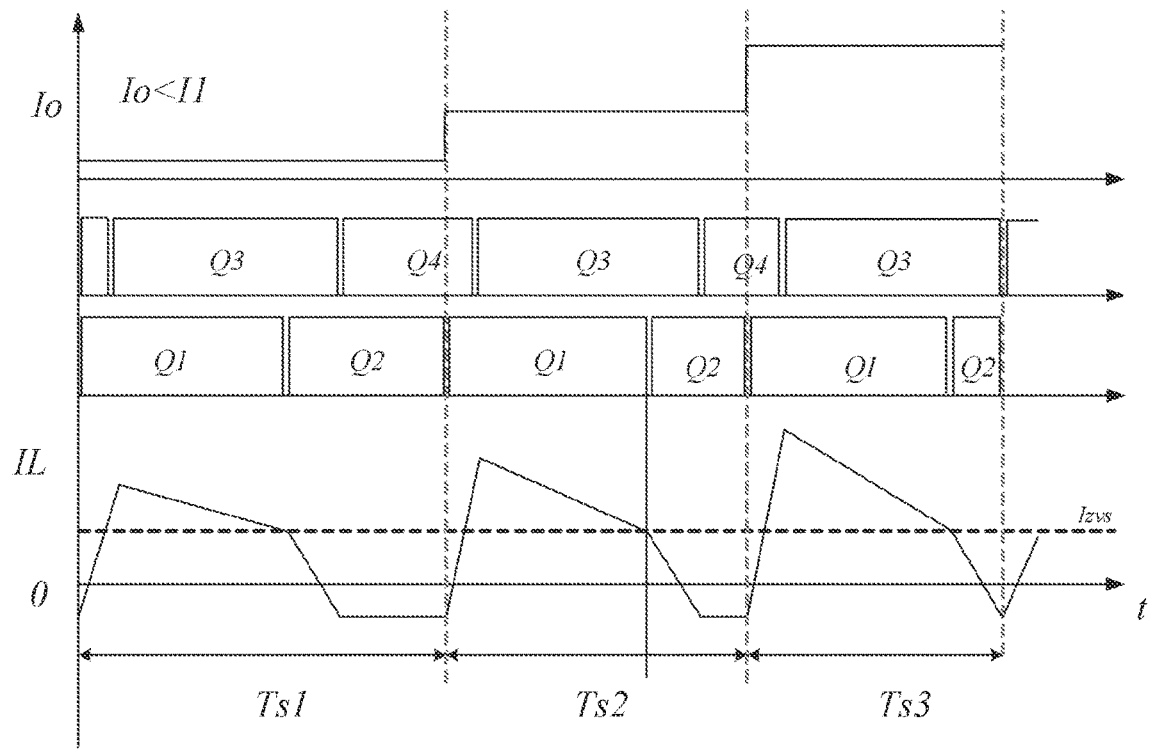
FIG. 6 is a waveform diagram of the variation in period T and the duration of each stage as a load increases under the condition of being below a critical load.
Figure 7:
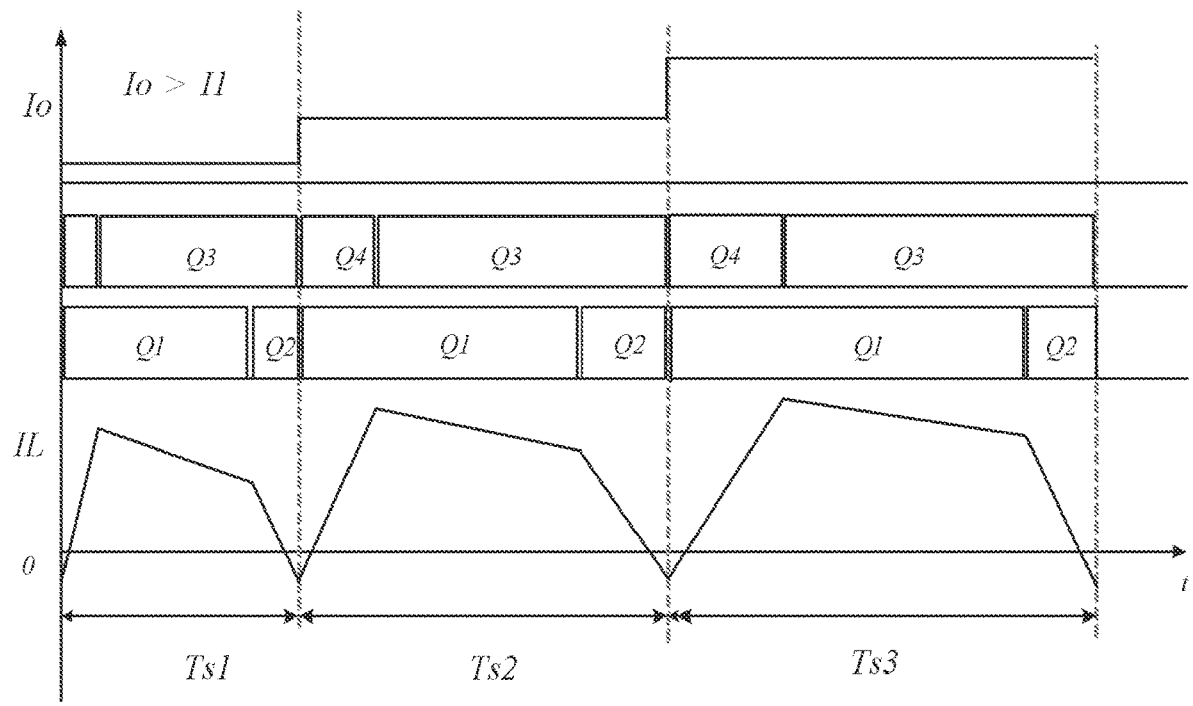
FIG. 7 is a waveform diagram of the variation in period T and the duration of each stage as a load increases under the condition of being above a critical load.

In Boost mode, when the load current is less than the critical load Il, with the increase of the load current Io, the variation of the duration of each stage and the work period T is shown in FIG. 6. The relationship between the operating frequency f and the load Io can be expressed as: f=kIo+q, $T_3$ is kept at the minimum value for achieving soft-switching, while $T_1$ and $T_2$ remain unchanged, only $T_4$ is decreased. Under the condition that the load current is greater than the critical load Il, with the increase of the load current, the variation of the duration of each stage and the work period $T_4$ is shown in FIG. 7. In this scheme, the operating frequency f decreases with the load current according to $f=a_1 Io^2+d_1 Io+c_1$, and $T_1$, $T_2$ and $T_3$ increase with the load current according to $T_1=k_1 Io+b_1$, $T_2=k_3 Io+b_2$ and $T_3=k_3 Io+b_3$ respectively (where k, q, $k_1$, $k_2$, $k_3$, $b_1$, $b_2$, $b_3$, $a_1$, $d_1$, $c_1$ are corresponding constants related to the input conditions in the Boost mode).

In Buck mode, when the load current is less than the critical load, with the increase of the load current Io, the variation of the duration of each stage and the work period T is shown in FIG. 6. The relationship between the operating frequency f and the load Io can be expressed as: f=mIo+nb, $T_1$ is kept at the minimum value for achieving soft-switching, while $T_2$ and $T_3$ remain unchanged, only $T_4$ is decreased. Under the condition that the load current is greater than the critical load Il, with the increase of the load current, the variation of the duration of each stage and the work period T is shown in FIG. 7. In this scheme, the operating frequency f decreases with the load current according to $f=a_2 Io^2+d_2 Io+c_2$, and $T_1$, $T_2$ and $T_3$ increase with the load current according to $T_1=m_1 Io+n_1$, $T_2=m_2 Io+n_2$ and $T_3=m_3 Io+n_3$ respectively (where m, n, $m_1$, $m_2$, $m_3$, $n_1$, $n_2$, $n_3$, $a_2$, $d_2$, $c_2$ are corresponding constants related to the input conditions in the Buck mode).

Compared with a fixed frequency control method, the control method for a four-switch buck-boost converter provided by the invention improves the voltage conversion efficiency of the converter by more than 10% in the range below the critical load; and in the range above the critical load, the voltage conversion efficiency of the converter is improved by about 15%. It can be seen that the control method proposed by the invention not only improves the efficiency of the four-switch buck-boost converter in the full load range, but also greatly improves the voltage conversion efficiency of the four-switch buck-boost converter in different load ranges.

The above embodiments only illustrate the technical idea of the invention, and cannot be used to limit the protection scope of the invention. Any changes made on the basis of the technical scheme according to the technical idea proposed by the invention fall within the protection scope of the invention.

What is claimed is:

1. A control method for a four-switch buck-boost converter, comprising:
   when a real-time load current of the four-switch buck-boost converter reaches a critical load at a current input voltage, adjusting a duration of a powering mode and a duration of a reset mode based on a principle of minimizing a soft-switching time of each transistor switch in the four-switch buck-boost converter, calculating a duration of a direct power path mode according to an energy formula, and adjusting a duration of an freewheeling mode to be zero;
   when the real-time load current of the four-switch buck-boost converter does not reach the critical load at the current input voltage, linearly increasing operating frequency with the real-time load current, keeping the duration of the powering mode, the duration of the direct power path mode and the duration of the reset mode at values corresponding to the critical load, and reducing the duration of the freewheeling mode; and
   when the real-time load current of the four-switch buck-boost converter exceeds the critical load at the current input voltage, quadratically decreasing the operating frequency with the real-time load, and determining linear growth coefficients of the duration of the powering mode, the duration of the direct power path mode and the duration of the reset mode in each working cycle based on a real-time input voltage.

2. The control method for the four-switch buck-boost converter according to claim 1, wherein when the four-switch buck-boost converter operates in a Boost mode, a method for adjusting the duration of the powering mode and the duration of the reset mode based on the principle of minimizing the soft-switching time for each transistor switch in the four-switch buck-boost converter comprises: adjusting the duration of the reset mode to be a shortest time for realizing soft-switching of each transistor switch in the four-switch buck-boost converter, and ending the powering mode when an inductor current crosses zero.

3. The control method for the four-switch buck-boost converter according to claim 1, wherein when the four-switch buck-boost converter operates in a Buck mode, a method for adjusting the duration of the powering mode and the duration of the reset mode based on the principle of minimizing the soft-switching time for each transistor switch in the four-switch buck-boost converter comprises: adjusting the duration of the powering mode to be a shortest time for realizing soft-switching of each transistor switch in the four-switch buck-boost converter, and ending the reset mode when an inductor current crosses zero.

4. The control method for the four-switch buck-boost converter according to claim 1, wherein when the four-switch buck-boost converter operates in a Boost mode, a linearly increasing coefficient and a quadratically decreasing coefficient are constants related to an input voltage in the Boost mode.

5. The control method for the four-switch buck-boost converter according to claim 1, wherein when the four-switch buck-boost converter operate in a Buck mode, a linearly increasing coefficient and a quadratically decreasing coefficient are constants related to an input voltage in the Buck mode.

6. The control method for the four-switch buck-boost converter according to claim 1, wherein when the four-switch buck-boost converter operates in a Boost mode, linear growth coefficients of the duration of the powering mode, the duration of the direct power path mode and the duration of the reset mode in each working cycle are constants related to an input voltage in the Boost mode, and the linear growth coefficients of the duration of the powering mode, the duration of the direct power path mode and the duration of the reset mode are different in each working cycle.

7. The control method for the four-switch buck-boost converter according to claim 1, wherein when the four-switch buck-boost converter operates in a Buck mode, linear growth coefficients of the duration of the powering mode, the duration of the direct power path mode and the duration of the reset mode in each working cycle are constants related to an input voltage in the Buck mode, and the linear growth coefficients of the duration of the powering mode, the duration of the direct power path mode and the duration of the reset mode are different in each working cycle.

8. The control method for the four-switch buck-boost converter according to claim 1, wherein a method of determining the critical load comprises: establishing a model describing a relationship between loss and frequency of the four-switch buck-boost converter at different input voltages, with an objective of minimizing a total loss comprising a conduction loss, a turn-off loss and a drive loss; obtaining an operating frequency with a minimum loss at different input voltages based on the model; fitting the relationship between the operating frequency with the minimum loss and a load current at different input voltages; and taking a load current corresponding to a maximum frequency point under a same input voltage as the critical load at the input voltage.

9. The control method for the four-switch buck-boost converter according to claim 8, wherein a method for establishing the model describing the relationship between the loss and the frequency of the four-switch buck-boost converter at different input voltages comprises: setting the operating frequency as a variable, solving the loss corresponding to different load currents in each cycle under the same input voltage, and drawing loss curves of the four-switch buck-boost converter corresponding to different load currents under the same input voltage.

10. A control signal generator used in a control method for a four-switch buck-boost converter, comprising a voltage acquisition circuit, a current acquisition circuit and a controller, wherein the voltage acquisition circuit acquires a real-time input voltage and a real-time output voltage of the four-switch buck-boost converter, the current acquisition circuit acquires a real-time load current of the four-switch buck-boost converter, and the controller generates driving signals for each transistor switch in the four-switch buck-boost converter based on the real-time input voltage, the real-time output voltage and the real-time load current of the four-switch buck-boost converter through the control method for the four-switch buck-boost converter according to claim 1.

11. The control signal generator according to claim 10, wherein in the control method for the four-switch buck-boost converter, when the four-switch buck-boost converter operates in a Boost mode, a method for adjusting the duration of the powering mode and the duration of the reset mode based on the principle of minimizing the soft-switching time for each transistor switch in the four-switch buck-boost converter comprises: adjusting the duration of the reset mode to be a shortest time for realizing soft-switching of each transistor switch in the four-switch buck-boost converter, and ending the powering mode when an inductor current crosses zero.

12. The control signal generator according to claim 10, wherein in the control method for the four-switch buck-boost converter, when the four-switch buck-boost converter operates in a Buck mode, a method for adjusting the duration of the powering mode and the duration of the reset mode based on the principle of minimizing the soft-switching time for each transistor switch in the four-switch buck-boost converter comprises: adjusting the duration of the powering mode to be a shortest time for realizing soft-switching of each transistor switch in the four-switch buck-boost converter, and ending the reset mode when an inductor current crosses zero.

13. The control signal generator according to claim 10, wherein in the control method for the four-switch buck-boost converter, when the four-switch buck-boost converter operates in a Boost mode, a linearly increasing coefficient and a quadratically decreasing coefficient are constants related to an input voltage in the Boost mode.

14. The control signal generator according to claim 10, wherein in the control method for the four-switch buck-boost converter, when the four-switch buck-boost converter operate in a Buck mode, a linearly increasing coefficient and a quadratically decreasing coefficient are constants related to an input voltage in the Buck mode.

15. The control signal generator according to claim 10, wherein in the control method for the four-switch buck-boost converter, when the four-switch buck-boost converter operates in a Boost mode, linear growth coefficients of the duration of the powering mode, the duration of the direct power path mode and the duration of the reset mode in each working cycle are constants related to an input voltage in the Boost mode, and the linear growth coefficients of the duration of the powering mode, the duration of the direct power path mode and the duration of the reset mode are different in each working cycle.

16. The control signal generator according to claim 10, wherein in the control method for the four-switch buck-boost converter, when the four-switch buck-boost converter operates in a Buck mode, linear growth coefficients of the duration of the powering mode, the duration of the direct power path mode and the duration of the reset mode in each working cycle are constants related to an input voltage in the Buck mode, and the linear growth coefficients of the duration of the powering mode, the duration of the direct power path mode and the duration of the reset mode are different in each working cycle.

17. The control signal generator according to claim 10, wherein in the control method for the four-switch buck-boost converter, a method of determining the critical load comprises: establishing a model describing a relationship between loss and frequency of the four-switch buck-boost converter at different input voltages, with an objective of minimizing a total loss comprising a conduction loss, a turn-off loss and a drive loss; obtaining an operating frequency with a minimum loss at different input voltages based on the model; fitting the relationship between the operating frequency with the minimum loss and a load current at different input voltages; and taking a load current corresponding to a maximum frequency point under a same input voltage as the critical load at the input voltage.

18. The control signal generator according to claim 17, wherein in the control method for the four-switch buck-boost converter, a method for establishing the model describing the relationship between the loss and the frequency of the four-switch buck-boost converter at different input voltages comprises: setting the operating frequency as a variable, solving the loss corresponding to different load currents in each cycle under the same input voltage, and drawing loss curves of the four-switch buck-boost converter corresponding to different load currents under the same input voltage.

\* \* \* \* \*